May 2, 1933.    C. H. WHITE    1,906,351
COMBINED PLANTER AND FERTILIZER DISTRIBUTOR
Filed July 18, 1927    4 Sheets-Sheet 1

Witness
Milton Lenoir

Inventor.
Charles H. White,
By
John L. Jackson.
Attorney.

May 2, 1933.  C. H. WHITE  1,906,351
COMBINED PLANTER AND FERTILIZER DISTRIBUTOR
Filed July 18, 1927  4 Sheets-Sheet 2

Witness
Milton Lenoir

Inventor
Charles H. White,
John L. Jameson.
Attorney.

May 2, 1933.  C. H. WHITE  1,906,351
COMBINED PLANTER AND FERTILIZER DISTRIBUTOR
Filed July 18, 1927  4 Sheets-Sheet 3
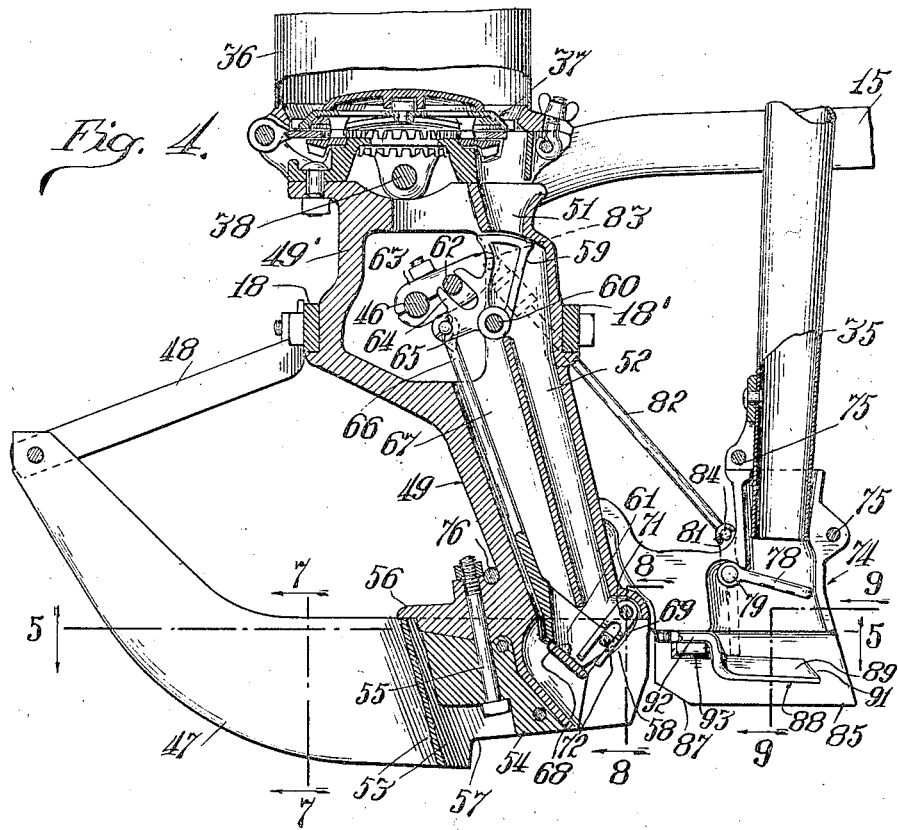
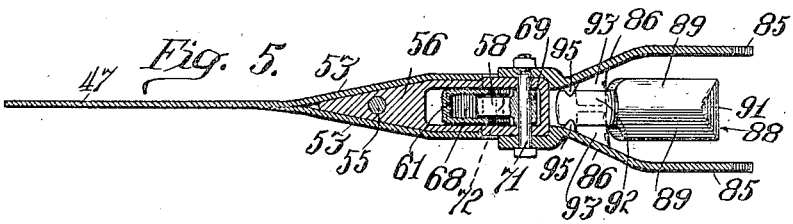
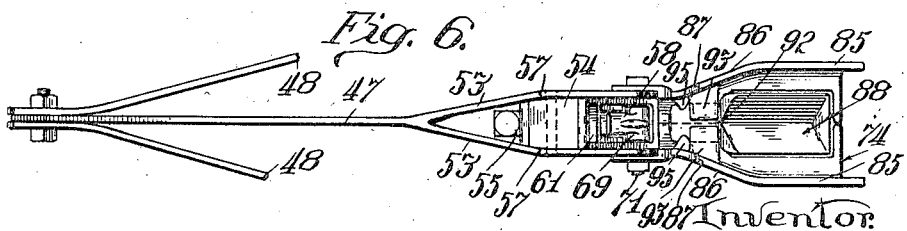

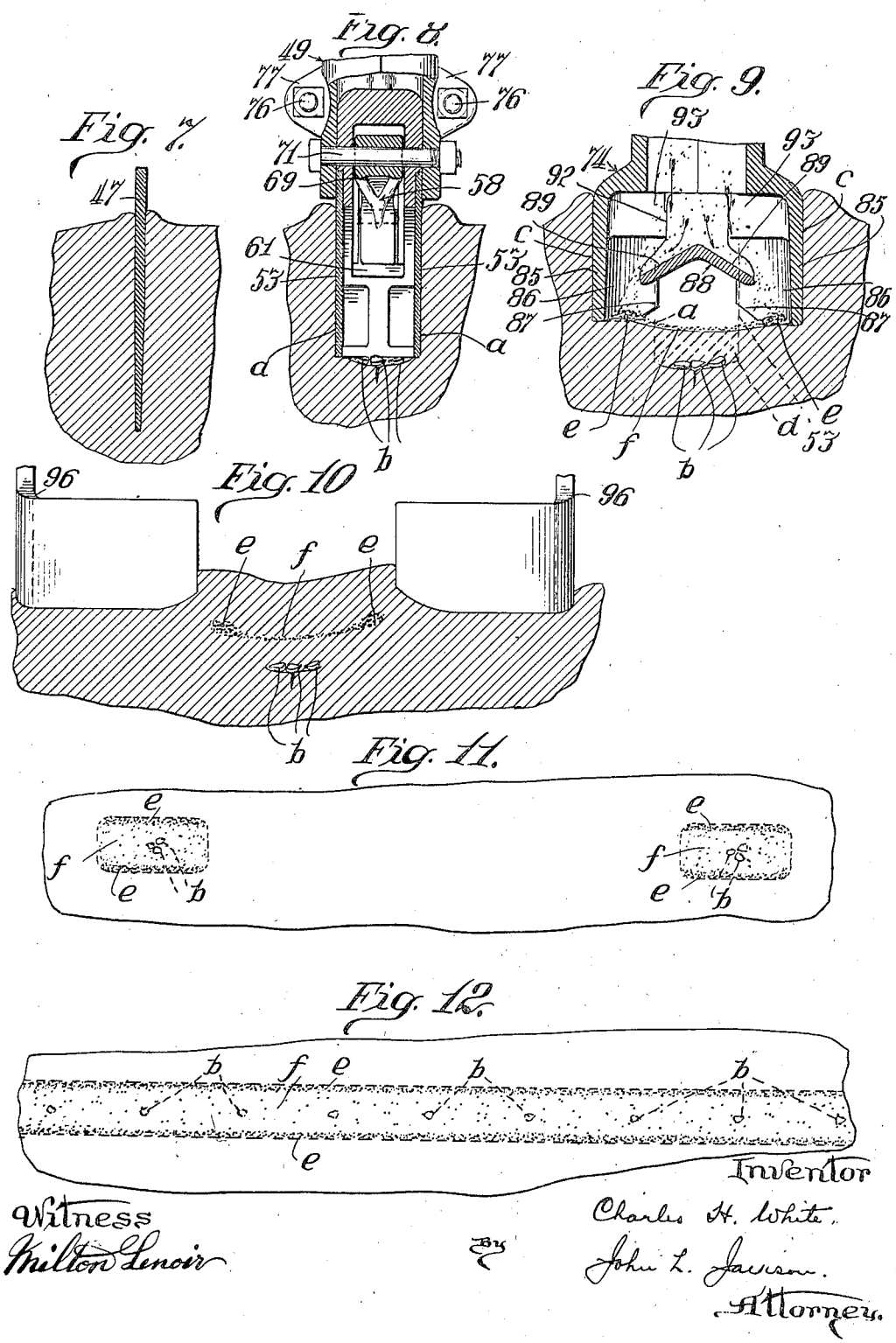

Patented May 2, 1933

1,906,351

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

COMBINED PLANTER AND FERTILIZER DISTRIBUTOR

Application filed July 18, 1927. Serial No. 206,429.

My invention relates to planting implements of the type which distribute fertilizer along with the planting operation, as by depositing the fertilizer in a furrow in the seed bed in proximity to the seed.

In distributing fertilizer in this manner, it is desirable that the fertilizer be imbedded in the soil in close proximity to the seed, so that it will be of maximum benefit in supplying its nourishing properties to the seed and to the growing plant, but at the same time no appreciable quantity of the fertilizer should be allowed to come into direct contact with the seed, as such has a tendency to detrimentally affect the germination of the seed and the growth of the plant. The latter is commonly referred to as "firing" of the seed, and should be avoided in practically all planting operations.

One of the principal objects of the invention is to provide an improved method of planting seed and distributing fertilizer by which the bulk of the fertilizer is so distributed as to be of maximum benefit for supplying its properties to the seed and to the plant, but without the possibility of firing the seed. More specifically, this distribution consists in spreading the fertilizer in a relatively thin stratum spaced from the seed by an intervening layer of soil, and with the major portion of the fertilizer disposed laterally to each side of the seed. As will hereinafter appear in the following description of the invention, by this method the seed derives the full benefit of the nourishing properties of the fertilizer, but without permitting the seed or the plant sprouting therefrom to come into direct contact with any concentrated quantities of the fertilizer.

Another object of the invention is to provide improved apparatus for carrying out this method.

A further object of the invention is to provide a planting implement designed for check-row planting or for drilling, wherein the depositing of the fertilizer can be placed under the control of the check-row mechanism so that the fertilizer can be deposited in hills along with the hill dropping of the seed in check-row planting, or can be deposited with a continuous feed, as when drilling the seed.

Other objects and advantages of the invention will be apparent from the following description of a preferred embodiment thereof.

In the drawings illustrating such embodiment:

Figure 4 is a longitudinal sectional view through one of the furrow openers, showing the seed and fertilizer valve mechanisms in detail.

Figure 5 is a horizontal sectional view through the same, taken on the plane of the line 5—5 of Figure 4.

Figure 6 is an inverted plan view of the furrow opener and its associated parts.

Figure 7 is a vertical sectional view taken on the plane of the line 7—7 of Figure 4.

Figures 8 and 9 are vertical sectional views taken on the planes of the line 8—8 and 9—9 respectively of Figure 4, and showing the successive operations of planting the seed and distributing the fertilizer above the same.

Figure 10 is a vertical sectional view taken in rear of the covering blades and showing the covering operation.

Figure 11 is a diagrammatic view illustrating the preferred method of distributing the fertilizer in check-row planting; and Figure 12 is a similar view illustrating the fertilizer drilled in the seed bed along with the drilling of the seed.

While the aforementioned object of distributing the fertilizer in a relatively thin stratum spaced from the seed, with the major portion of the fertilizer disposed laterally to each side of the seed, has general application to various types of planters, the feature of controlling the depositing of the fertilizer by the check-row mechanism has particular application to planting implements designed either for check-row planting or for drilling, and accordingly I have disclosed my invention embodied in such type of implement.

Figure 1:
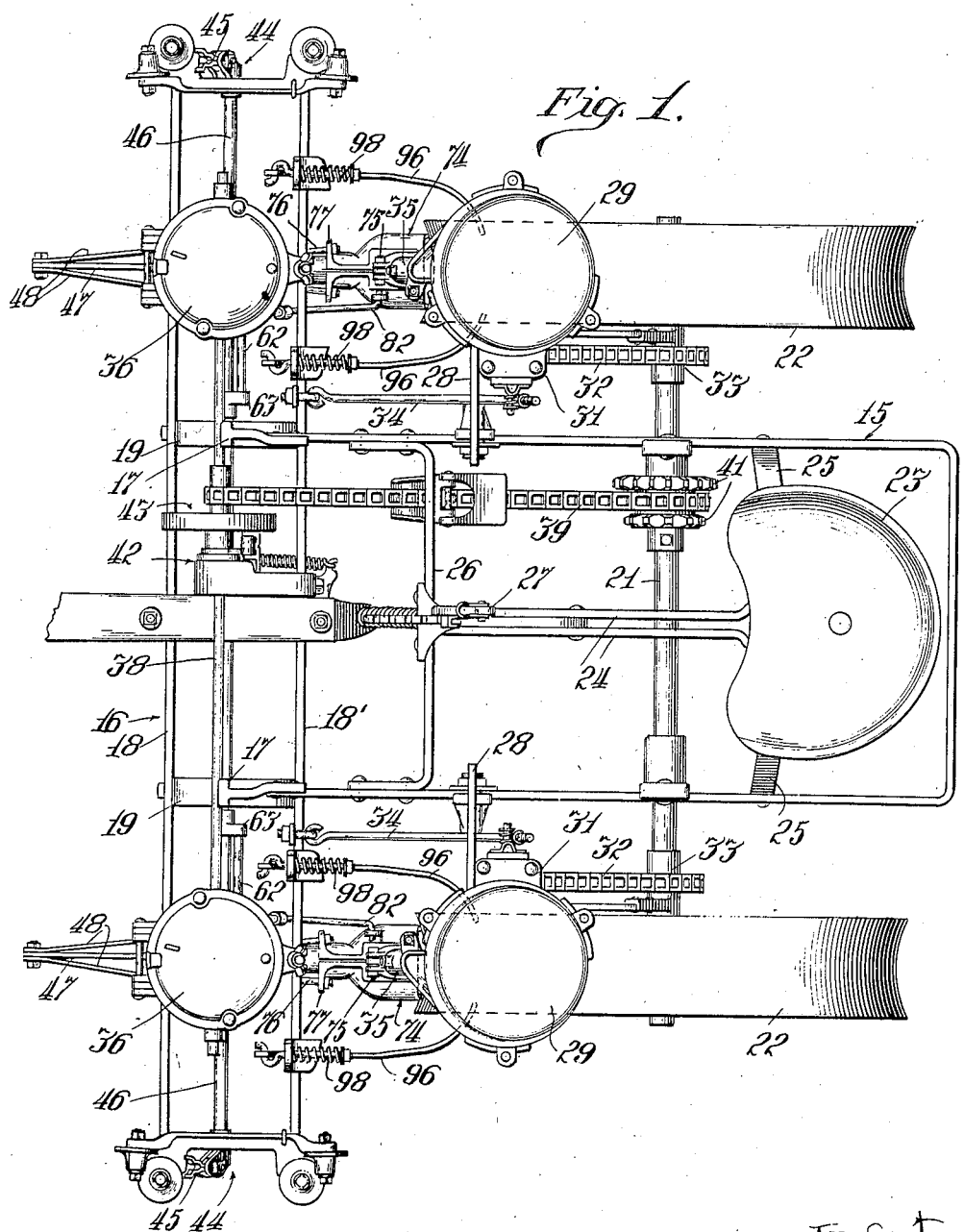
Figure 1 is a plan view of the implement.
Figure 2:
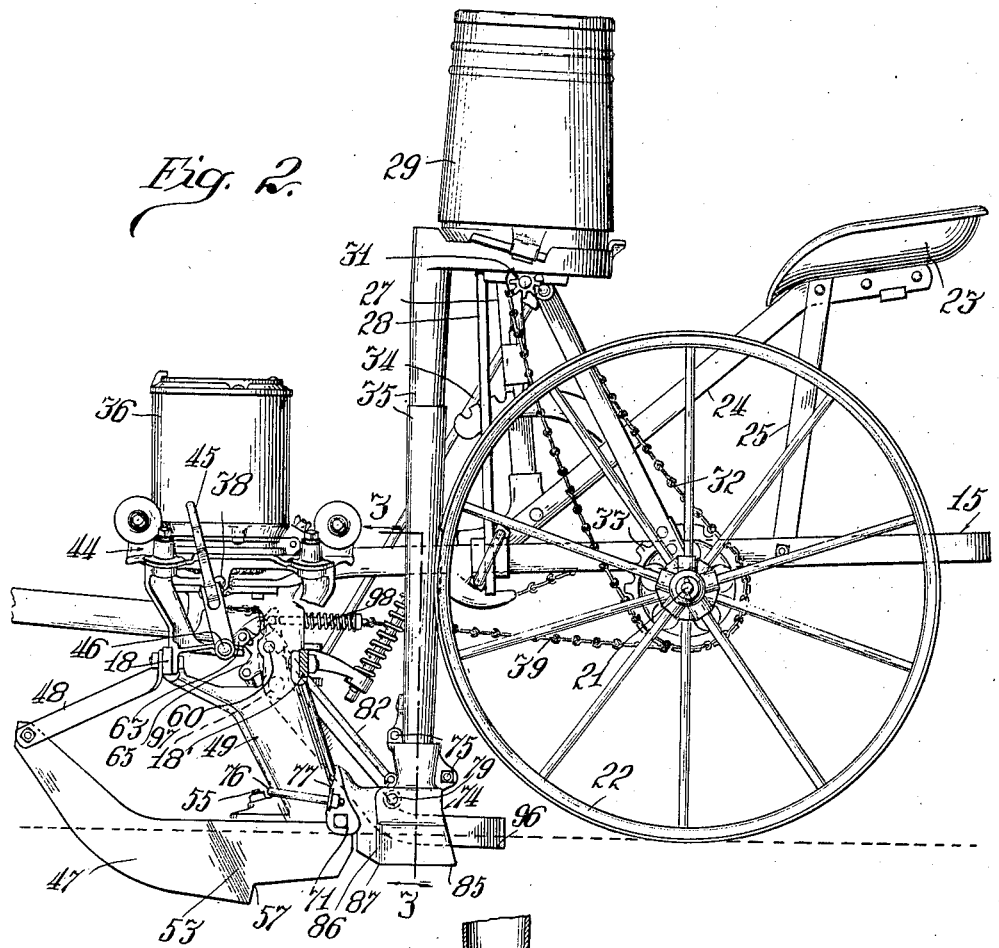
Figure 2 is a side elevational view of the same.
Figure 3:
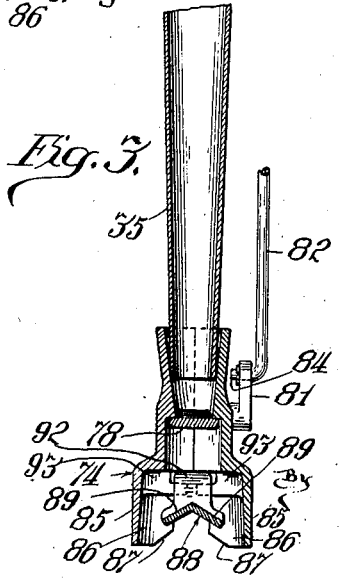
Figure 3 is a detail sectional view of the fertilizer boot and the valve mechanism therein, taken on the plane of the line 3—3 of Figure 2.

Figures 1 and 2 illustrate a conventional two-row planter of this type, implements of this class being commonly referred to as corn planters, although they are also extensively used for the planting of beans, peas, peanuts, etc. In describing the implement I shall only refer briefly to the elements which are old and well known. The implement comprises the usual back frame 15 and front frame 16, which are pivotally connected together at 17. The front frame comprises two spaced parallel bars 18—18' to which cross braces 19 are secured, the pivotal connection between the frames being effected at these cross braces. Secured to the back frame 15 is the usual axle 21 on which the two traction wheels 22 are journaled, the latter being usually arranged for shiftable adjustment inwardly and outwardly on the axle. The operator's seat 23 is supported on the back frame 15, being secured to front and rear pairs of braces 24 and 25, the front pair of braces 24 being secured at their lower ends to a cross bar 26, which reinforces the back frame. The usual tilting or adjusting lever 27 is shown as being pivoted to these front braces.

Rising from the sides of the back frame are two brackets 28 which support the two fertilizer hoppers 29, each of these hoppers supplying fertilizer to one of the planting rows. Associated with each of said hoppers is any conventional feeding mechanism for effecting a substantially uniform feed of the fertilizer from the hopper down into the boot, where the fertilizer is deposited in the seed furrow. As exemplary of such feeding mechanism, a revolving hopper bottom and a stirring arm may be employed, the mounting and operation of the same being well known. The feeding mechanism of each hopper is indicated generally at 31, and is driven by a chain 32 which has suitable operative connection with the feeding mechanism. Each chain passes over an individual sprocket wheel 33 driven by the associated traction wheel 22, and any suitable clutch mechanism may be provided for manually starting and stopping the drive of the feed mechanism 31. Automatic means may also be provided for the purpose of interrupting the feed of fertilizer when the furrow openers are raised clear of the ground, the links 34, which are operatively connected between the front frame 16 and the fertilizer feed mechanism, being representative of such automatic control means. The fertilizer is discharged from the feed mechanism 31 into a spout or tube 35, where it drops into a lower boot traveling in the seed furrow, as I shall presently describe.

Mounted on the front frame 16 are two seed hoppers 36, with which are associated suitable seed feeding or delivering mechanisms, represented by the rotating seed plate 37 shown in Figure 4. These seed separating and feeding mechanisms may be of any preferred type, and require no detailed description inasmuch as, per se, they do not constitute any part of the present invention. Both of such delivering or feeding mechanisms 37 are driven by a cross shaft 38 which has bearing support on the front frame 16 and which is driven by a sprocket chain 39 extending back to the axle 21. Here the chain is adapted to pass selectively over any one of a series of sprockets 41 of different diameters, whereby the rate of travel of the chain can be adjusted. The drive of the chain 39 is transmitted to the shaft 38 through a variable speed unit indicated in its entirety at 42 (Figure 1), the latter being of any conventional type of securing a variable drop of the seed whereby different numbers of the seeds or kernels can be planted in each hill, as desired. Suitable clutch mechanism indicated at 43 is usually provided for throwing the seed delivering mechanisms into and out of operation.

Also mounted on the front frame 16, at the outer ends thereof, are conventional check-row mechanisms indicated generally at 44, each of said mechanisms comprising an oscillatory fork or lever 45 adapted to be engaged by the buttons or stop numbers on the check-wire. The guiding of the check-wire and the general construction of the check-heads is old and well known, and need not be described in detail. Each fork or lever 45 is usually mounted on a rock shaft 46 which is pivotally supported on the front frame 16, said shaft having operative connection with the clutch mechanism 43 as well as with suitable valve mechanism which controls the hill dropping of the seed, as I shall presently describe.

The two seed furrows may be opened by any suitable furrow openers, such as discs, runners or the like, but in the preferred construction I employ runners such as are indicated at 47. The upwardly curved front end of each runner is secured to the front frame by bracing links 48, and the rear end of the runner is secured to a runner shank 49 which is also bolted to the front frame between the side bars 18—18'. The upper portion of the runner shank is constructed in the form of a frame 49', on which is mounted the seed hopper 36. Formed in such frame portion 49' is a small seed collecting chamber or passage 51 into which the seed is dropped from the feeding plate 37. From such chamber 51 the seed is adapted to drop down to the lower portion of the runner shank through a passage 52 formed therein, the dropping of the seed from the chamber 51 into the passage 52, and from the passage 52 into the furrow, being controlled by suitable valve mechanism which I shall presently describe.

The fore part of the runner is relatively thin for cutting into the soil and the rear part tapers outwardly in wedge formation for opening the seed furrow, as best shown in Figures 5 and 6. The tapered rear portion consists of two side walls 53—53 between which is riveted a tapered reinforcing block 54. The block is secured by a bolt 55 to a flange 56 extending forwardly from the runner shank 49. The lower edge of the runner shank is preferably cut away as indicated at 57, and the seed is adapted to be dropped into the seed trench between the spaced rear ends of the side plate portions 53 through an opening or passageway 58 formed in the bottom of the runner shank. In check-row planting the dropping of the seeds or kernels into the furrow is controlled by upper and lower valves 59 and 61 respectively. The upper valve 59 is mounted on a pivot 60 so as to swing into and out of registry with the lower end of the chamber or passage 51. When the valve is in the position shown in Figure 4 the kernels accumulate on the upper surface of the valve, and upon rocking movement thereof to the left the kernels are wiped off the surface of the valve and dropped down through the passage 52. Such rocking movement of the valve is effected by a crank pin 62 which is mounted in spaced arms 63 secured to the rock shaft 46, said crank pin operating in a slotted yoke 64 projecting from the valve 59. Pivotally connected to the upper valve element at 65 is a rod 66 which constitutes a part of the lower valve element 61. The rod 66 extends down through a second passage 67, formed in the runner shank 49 alongside the passage 52. The lower valve comprises spaced side wing portions which have sliding support on an inclined surface 68, formed as an integral part of the runner shank. The lower valve element also comprises a valve gate 69, which is pivotally supported at its upper end on a transverse pivot pin 71. The lower portion of such valve gate extends forwardly on an incline between the spaced side wings of the valve element 61 so as to deflect the kernels falling through the passage 52 upon the stationary supporting surface 68. The valve gate is slotted to straddle a pin 72 extending between the side wing portions, whereby the gate is swung downwardly and rearwardly with the downward movement of the valve element, thereby dropping the kernel or kernels which have accumulated on the surface 68. It will be evident from the foregoing description that in check-row planting the feeding plate 37 will feed or deliver a predetermined number of kernels to the chamber 51 where such kernels will accumulate on the upper surface of the valve 59, and as each succeeding button or stop on the check-wire engages the fork 45 the upper and lower valves will be actuated to drop such accumulations of kernels down into the seed furrow at the tail end of the runner 47. When the implement is to be used for drilling, the upper and lower gates 59 and 61 are moved to their open positions and held in such positions, allowing the kernels to fall directly from the feeding plate 37 down through the passage 52 and into the furrow. A foot lever or any other suitable control member is usually provided for holding the valves in their open positions.

Attached to the runner shank 49 in rear of the runner 47, is a valve boot 74 through which the fertilizer is discharged into the furrow. such valve boot receiving the lower end of the spout or tube 35 which extends down from the fertilizer hopper. In the construction shown I have illustrated the fertilizer distributing mechanism as comprising an attachment adapted for ready mounting on a planting implement, and in such embodiment the valve boot 74 is constructed as a separate unit adapted for attachment to and detachment from the runner, but it will be obvious that such valve boot might be constructed as an integral part either of the runner or runner shank. In the construction shown, the valve boot is divided longitudinally into two similar sections which are clamped together over the tube 35 by bolts 75. It is also secured to the runner shank by a U-shaped clamping bolt 76 which encircles the shank and passes through lugs 77 projecting laterally from the sides of the boot (Figure 2). The pivot 71 on which the valve gate 69 is mounted consists of a bolt which is extended through side flanges of the boot for aiding in securing the latter to the runner.

Mounted in the upper part of the boot, directly below the end of the tube 35 is a dumping valve 78. This valve is secured to a pivot shaft 79 extending through one of the side portions of the boot and carrying an arm 81 at its outer end. A link 82 is pivotally connected to this arm and extends upwardly for pivotal connection at 83 to one of the crank arms 63. The parts are so arranged that when the seed valves 59 and 61 are in their closed positions the fertilizer valve 78 is in its closed position, and with each operation of the seed valves for the dropping of the seeds the fertilizer valve is rocked downwardly to dump the accumulation of fertilizer which has collected thereon down through the boot and into the furrow. When the seed valves are locked in their open positions for drilling the seed, the fertilizer valve 78 is correspondingly held in its open position so that the fertilizer is fed continuously under the control of its feeding mechanism 31. The pivotal connection 84 between the arm 81 and link 82 is preferably of a type permitting ready disconnection of these parts so that, if desired, the fertilizer valve 78 may remain in its open position independently of the operation of the seed valves 59 and 61. It will be evident that under these conditions the seeds or kernels will be dropped in hills, and the fertilizer will be distributed as a continuous band or stratum.

Referring to Figures 5, 6 and 9, the lower portion of the boot 74 comprises spaced side walls or wings 85—85 which serve to widen the upper portion of the furrow cut by the runner 47. At their front ends the side walls converge inwardly to aproximately the width of the rear end of the runner, as indicated at 86, so as to spread the sides of the furrow apart, the rear portions of such side walls extending substantially in parallelism and separated from each other in approximately the arrangement shown in Figure 9. The side walls 85—85 run at a somewhat shallower depth than the runner 47, and only function to widen the upper portion of the furrow, above the plane of the seed which has been dropped therein. As best shown in Figures 4 and 9, the front tapering corners of the side walls 85 are cut away on a bevel, as indicated at 87. The action of such bevelled corners is to cut slices of soil from the side walls of the relatively narrow seed furrow, in the act of widening the latter, and to turn these slices of soil inwardly over the seed (see Figure 9).

Mounted between the side walls 85 is a deflecting member 88 which serves to laterally distribute or spread the major portion of the fertilizer towards the sides of the widened furrow. Such deflecting member is of wedge shaped cross section to form two laterally sloping side walls 89 which divide the fertilizer falling thereon and deflect approximately equal quantities thereof outwardly towards the side walls 85 of the fertilizer boot. Formed at the rear end of the deflecting member is a downwardly sloping rear wall 91 which serves to deflect a relatively small portion of the fertilizer rearwardly therefrom to form a relatively thin stratum of fertilizer extending across the entire width of the widened furrow. The deflecting member is detachably mounted in the boot through the provision of a shank portion 92 which rests upon companion lugs 93 projecting inwardly from the two boot sections. Endwise movement of the deflecting member is prevented by forming notches in the sides of the shank portion 92, into which extend lugs 95 (Figure 6) projecting inwardly from the side walls of the boot.

Engaging with the soil in rear of each fertilizer boot 74 is a pair of covering blades 96 which are curved inwardly to scrape or deflect the ridges of soil which have been turned up along the sides of the furrow back into the furrow in a covering operation. Such blades have any suitable connection with the front frame 16, being preferably pivoted thereto as indicated at 97 (Figure 2) and being resiliently pressed down into operative position by spring bolts 98 which are operatively connected to the blades and to the frame. The traction wheels 22 which immediately follow the covering blades 96 also assist in the covering operation.

Referring now to the operation of the implement, and with particular reference to Figs. 7 to 12 inclusive, each runner 47 first opens a seed furrow $a$ in the soil. Into this furrow the seeds $b$ are dropped from the seed feeding apparatus represented by the hopper 36 and the feeding plate 37. Depending upon whether the valve means 59 and 61 are set for check-row operation or are held in open position, the seeds $b$ will be planted in hills or will be planted singly. The boot 74, in immediately following the rear end of the runner, prevents the side walls of the seed furrow from collapsing and gradually widens the upper portion of the furrow through the long taper of its side walls 86. Only the upper portion of the seed furrow, above the planted depth of the seed, is widened, such widened portion being indicated at $c$ (Figure 9). Simultaneously with this operation of widening the upper portion of the furrow, the lower portion thereof is covered over by a layer of soil indicated in dotted lines at $d$ in Fig. 9. Such layer of soil is turned inwardly over the seeds $b$ by the beveled corners 87 in the tapered side walls 86, each of these cut-away corners permitting the soil, which is now being compressed along the sides of the seed furrow by the tapered walls, to slip in under the walls, and also acting to shear off portions of the furrow sides and to turn the same inwardly over the seeds.

The parallel walls 85 of the boot prevent the sides of the widened furrow portion $c$ from collapsing while the fertilizer is being deposited in the furrow from the fertilizer feeding apparatus, represented by the hopper 29, feeding mechanism 31 and spout 35. Depending upon whether the fertilizer valve means 78 is operatively connected for intermittent movement with the seed valve means 59—61 or is held continuously in its open position, the fertilizer will be deposited intermittently with the check-row planting of the seed or will be deposited continuously with the drilling of the seed. The fertilizer in striking the deflecting member 88 is distributed in three directions. The major portion of the fertilizer is deflected laterally off the sloping side walls 89 and collects in accumulated or concentrated quantities $e$ just inside of the side walls 85 of the boot. A lesser proportion of the fertilizer is deflected rearwardly off the sloping rear wall 91 and results in a thin stratum or band $f$ of fertilizer extending substantially between the accumulated quantities $e$. The covering blades 96 in following along behind the boot 74 scrape the adjacent soil, including the ridges turned up along the sides of the furrow, back into the furrow to cover the fertilizer, as shown in Fig. 10. The traction wheels 22 also assist in this covering operation.

Figure 11 illustrates approximately the distribution of the fertilizer with respect to the seed when both are deposited in the furrow under check-row operation. It will be observed that, owing to the forward speed of travel of the implement, each deposit of fertilizer will be superposed more or less directly over its hill of kernels $b$. Figure 12 illustrates the distribution of the fertilizer with respect to the seed when both are deposited in the furrow in a drilling operation, i. e. when the seed valves 59—61 and the fertilizer dump valve 78 are held in their open, inoperative positions. By disconnecting the fertilizer valve from the seed valves, it is also possible to drop the seed in hills, as shown in Figure 11, and to deposit the fertilizer as a continuous band over the seed, as shown in Figure 12.

The young plant in sprouting up from each seed passes through the thin stratum $f$ of fertilizer, thus bringing the plant into contact with a diffused quantity of fertilizer for absorbing the nutritive properties thereof. The concentrated quantities of fertilizer $e$ are disposed advantageously for the seed and plant to derive the nourishing properties thereof, but have no contact with the seed and hence cannot cause firing thereof.

What I claim as my invention and desire to secure by Letters Patent is:

1. In an implement of the class described, the combination of means for opening a furrow, means for planting the seed therein, means for covering the seed with a layer of soil, and fertilizer feeding means including means for depositing fertilizer on said layer of soil and means for spreading the major portion thereof laterally along opposite sides of the furrow.

2. In an implement of the class described, the combination of means for opening a seed furrow, means for planting the seed therein, means for covering the seed with a layer of soil, fertilizer feeding means discharging into said furrow above said layer of soil, and a wedge-shaped deflector having a sloping rear wall, said deflector cooperating with said feeding means for distributing the fertilizer in the form of a band with the major portion of the fertilizer concentrated along the edges of said band.

3. In an implement of the class described, the combination of means for opening a seed furrow, means for planting the seed therein, means for widening the furrow above the planted depth of the seed and covering the seed with a layer of soil, fertilizer feeding means adapted to discharge fertilizer into the widened portion of the furrow above said layer of soil, and deflecting means cooperating with said feeding means for causing the fertilizer to be distributed in the form of a thin stratum with concentrated quantities of the fertilizer disposed along the sides of the widened portion of said furrow.

4. In an implement of the class described, the combination of a furrow opener adapted to open a seed furrow, seed feeding apparatus, check-row valve mechanism cooperating therewith for controlling the planting of the seed in said furrow, a boot arranged to widen the furrow above the planted depth of the seed for receiving fertilizer, fertilizer feeding apparatus, valve means cooperating therewith controlling the depositing of the fertilizer through said boot into the widened portion of said furrow, mechanism operatively connecting said last named valve means with said check-row valve mechanism, and deflecting means cooperating with said fertilizer feeding apparatus for causing the fertilizer to be distributed in the form of a thin stratum above the plane of the seed with the major portion thereof disposed laterally along the sides of the furrow.

5. In an implement of the class described, the combination of a furrow opener adapted to open a seed furrow, seed feeding apparatus adapted to discharge seed into said furrow, a boot arranged to enter the furrow in rear of said furrow opener, fertilizer feeding apparatus adapted to discharge fertilizer into the furrow through said boot, and a deflecting member spaced from the side and rear walls defining said boot for causing the major portion of the fertilizer to be deflected laterally towards the sides of said furrow.

6. In an implement of the class described, the combination of means for opening a furrow, means for planting seed therein, means for widening the upper portion only of said furrow comprising a pair of spaced side walls having tapered forward portions cut away to deflect soil inwardly into the lower portion of said furrow over the seed, and means for depositing fertilizer between said side walls into the widened upper portion of said furrow.

7. In an implement of the class described, the combination of a furrow opener adapted to open a seed furrow, seed feeding apparatus, check-row valve mechanism cooperating therewith for controlling the planting of the seed in said furrow, a boot arranged to widen the furrow for receiving fertilizer, fertilizer feeding apparatus, valve means cooperating therewith controlling the depositing of the fertilizer through said boot into the widened portion of said furrow, mechanism operatively connecting said last named valve means with said check-row valve mechanism, and deflecting means cooperating with said fertilizer feeding apparatus causing the fertilizer to be distributed in form of a thin stratum with the major portions of the fertilizer disposed laterally along the sides of the furrow.

8. In an implement of the class described, the combination of a furrow opener adapted to open a seed furrow, seed feeding apparatus, check-row valve mechanism cooperating therewith for controlling the planting of the seed in said furrow, a boot arranged to widen the furrow for receiving fertilizer, fertilizer feeding apparatus disposed in rear of said seed feeding apparatus, valve means cooperating therewith controlling the depositing of the fertilizer through said boot into the widened portion of said furrow, mechanism operatively connecting said last named valve means with said check-row valve mechanism, and deflecting means cooperating with said fertilizer feeding apparatus for causing the fertilizer to be distributed laterally along the sides of the furrow.

9. In an implement of the class described, the combination of means for opening a seed furrow, means including seed valve mechanism and an associated housing for controlling the planting of the seed in said furrow, means for depositing fertilizer in said furrow including means for widening the seed furrow, and a U-bolt embracing the seed valve housing for holding the fertilizer depositing means.

10. In an implement of the class described, the combination of means for opening a seed furrow, means including a seed valve mechanism and an associated housing for controlling the planting of seed in said furrow, means including a casting for depositing fertilizer in said furrow, said casting being provided with means for widening the seed furrow, bolt means embracing the seed valve housing for holding the fertilizer depositing means, and a valve in said casting cooperating with said planting control means for controlling the depositing of fertilizer.

11. In an implement of the class described, the combination of means for opening a seed furrow, means including a seed valve mechanism and an associated housing for controlling the planting of seed in said furrow, means including a casting for depositing fertilizer in said furrow, said casting being formed with means for widening the seed furrow, means embracing the seed valve housing for holding the fertilizer depositing means in position with respect to the seed valve housing, a valve cooperating with said planting control means for controlling the depositing of fertilizer, and check-row mechanism operable to control said seed planting control means and said fertilizer valve.

12. In an implement of the class described, the combination of means for opening a seed furrow, means for planting seed therein, means for covering the seed with a layer of soil, fertilizer feeding means discharging into said furrow, a ridged deflecting member having a rearwardly sloping portion for distributing the fertilizer, and means for securing said fertilizer feeding means to said seed planting means.

13. In an implement of the class described, the combination of means for opening a seed furrow, means for planting seed therein, means for covering the seed with a layer of soil, fertilizer feeding means discharging into said furrow, and means providing a downwardly and rearwardly extending portion including laterally and downwardly inclined walls for distributing the fertilizer.

14. In an implement of the class described, the combination of a furrow opener adapted to open a seed furrow, seed feeding apparatus adapted to discharge seed into said furrow, a boot arranged to enter the furrow in rear of said furrow opener, fertilizer feeding apparatus adapted to discharge fertilizer into the furrow through said boot, and a deflecting member spaced from the walls defining said boot for causing the major portion of the fertilizer to be deflected laterally towards the sides of said furrow and a minor portion of the fertilizer to be deflected off the rear of said deflecting member.

15. In an implement of the class described, the combination of a furrow opener adapted to open a seed furrow, seed feeding apparatus adapted to discharge seed into said furrow, a boot arranged to enter the furrow in rear of said furrow opener, fertilizer feeding apparatus adapted to discharge fertilizer into the furrow through said boot, and a deflecting member spaced from the side walls defining said boot and spaced from the boot at its rear end for causing the major portion of the fertilizer to be deflected laterally towards the sides of said furrow and the minor portion to fall off the rear end of said member.

16. In an implement of the class described, the combination of a furrow opener adapted to open a seed furrow, seed feeding apparatus, valve mechanism cooperating therewith for controlling the planting of the seed in said furrow, a boot having means arranged to widen the seed furrow for receiving fertilizer by removing portions of the soil from the furrow and directing said portions so as to cover the seed therein, fertilizer feeding apparatus, valve means cooperating therewith controlling the depositing of the fertilizer through said boot into the widened portions of said furrow, mechanism operatively connecting said last named valve means with said valve mechanism, and deflecting means cooperating with said fertilizer feeding apparatus for causing the fertilizer to be distributed laterally along the sides of the furrow.

17. In an implement of the class described, the combination of a furrow opener adapted to open a seed furrow, seed feeding apparatus adapted to discharge seed into said furrow, a boot arranged to enter the furrow in rear of said furrow opener, fertilizer feeding apparatus adapted to discharge fertilizer into the furrow through said boot, a deflecting member spaced from the walls defining said boot for causing the major portion of the fertilizer to be deflected laterally toward the sides of the furrow, and means for supporting said member from said boot at its forward end only.

CHARLES H. WHITE.